United States Patent
Brain et al.

(10) Patent No.: US 8,687,463 B2
(45) Date of Patent: Apr. 1, 2014

(54) METHOD FOR PROCESSING AT LEAST TWO SETS OF SEISMIC DATA

(75) Inventors: Jonathan Brain, Aberdeen (GB); Céline Lacombe, London (GB); Frans Smit, Aberdeenshire (GB)

(73) Assignee: Cggveritas Services SA, Massy (FR)

( * ) Notice: Subject to any disclaimer, the term of this patent is extended or adjusted under 35 U.S.C. 154(b) by 1603 days.

(21) Appl. No.: 11/791,182

(22) PCT Filed: Nov. 18, 2005

(86) PCT No.: PCT/IB2005/004040
§ 371 (c)(1),
(2), (4) Date: Nov. 7, 2007

(87) PCT Pub. No.: WO2006/054181
PCT Pub. Date: May 26, 2006

(65) Prior Publication Data
US 2008/0170468 A1    Jul. 17, 2008

(30) Foreign Application Priority Data
Nov. 19, 2004  (GB) .................................. 0425593.1

(51) Int. Cl.
*G01V 1/28*  (2006.01)
*G01V 1/30*  (2006.01)

(52) U.S. Cl.
CPC ............... *G01V 1/301* (2013.01); *G01V 1/308* (2013.01)
USPC .................................. 367/38; 702/14; 702/16

(58) Field of Classification Search
USPC .......... 367/38, 40–42, 72, 63, 47–49; 702/14, 702/16
See application file for complete search history.

(56) References Cited

U.S. PATENT DOCUMENTS

| | | | | |
|---|---|---|---|---|
| 5,132,938 A | * | 7/1992 | Walters ........................... | 367/38 |
| 5,940,778 A | * | 8/1999 | Marfurt et al. .................. | 702/16 |
| 6,920,083 B2 | * | 7/2005 | Therond et al. ................. | 367/34 |
| 7,242,637 B2 | * | 7/2007 | Van Den Beukel et al. .... | 367/38 |
| 2002/0173917 A1 | | 11/2002 | Nickel | |
| 2002/0188406 A1 | | 12/2002 | Nivlet et al. | |
| 2003/0043693 A1 | | 3/2003 | Eastwood et al. | |
| 2003/0067843 A1 | | 4/2003 | Therond et al. | |

FOREIGN PATENT DOCUMENTS

WO   WO 98/11455   3/1998

OTHER PUBLICATIONS

Christie et al "Measuring and Improving Time-Lapse Seismic repeatability." Offshore Technology Conference, May 2004.*
Brittan, J. et al, "Azimuth Preserved Trace Binning of 4D Seismic Data for Improved Repeatability", EAGE 65th Conf. & Exhibition, Stavanger, Norway, Jun. 2-5, 2003, pp. 1-4.
Johnston, D et al., "A Tutorial on Time-Lapse Seismic Reservoir Monitoring", Annual Offshore Tech. Conf., vol. 1, No. 1, May 1997, pp. 141-146, XP002116273.

* cited by examiner

*Primary Examiner* — Ian J Lobo
(74) *Attorney, Agent, or Firm* — Patent Portfolio Builders PLLC

(57) ABSTRACT

This invention relates to a method for processing at least two seismic data sets (10, 20), each data set comprising several seismic traces (i, j) grouped by bins (Bi, Bj) and by offset classes (Oi, Oj), the method including the following steps: calculating at least one attribute (a(i, j)) characteristic of a similarity between a first trace (i) of a first data set (10) and a second trace (j) of a second data set (20), selecting or not the first and second traces (i, j) according to a selection criterion applied to the calculated attribute (a(i, j)).

23 Claims, 3 Drawing Sheets

METHOD FOR PROCESSING AT LEAST TWO SETS OF SEISMIC DATA

CROSS-REFERENCE TO RELATED APPLICATION

Figure 1:
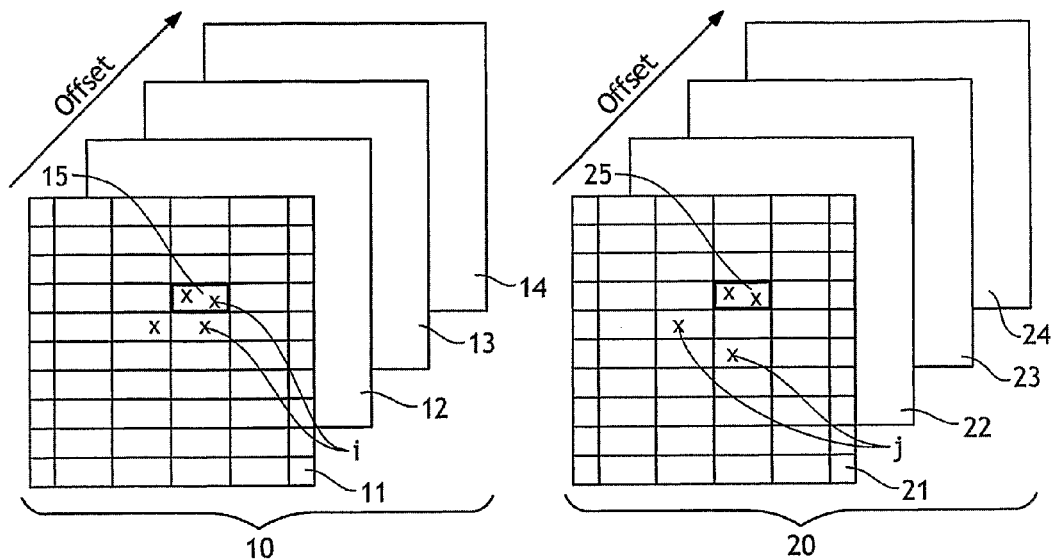

This national phase application is based on PCT/IB2005/004040 filed on Nov. 18, 2005 which claims priority to Great Britain Application No. 0425593.1 filed Nov. 19, 2004 entitled "Method for Processing at Least Two Sets of Seismic Data".

This invention relates to the field of acquisition and processing of seismic data. More precisely, the invention relates to the so-called "binning" step in 4D seismic.

The conventionally starting point in seismic exploration is to place several seismic sources and receivers on the ground surface and at a distance from each other. Seismic sources are activated to generate seismic waves that propagate in the subsoil. These seismic waves are affected by deviations during their propagation. They are refracted, reflected and diffracted at subsoil interfaces. Some waves that have propagated in the subsoil are detected by seismic receivers and are recorded in time in the form of signals (called traces). The recorded signals can be processed to obtain an image of underground geological structures.

In prestack imaging, seismic traces associated with a unique source-receiver pair are processed individually. On the contrary, in postack imaging, traces output from several source-receiver pairs are combined by stacking before being processed. The postack imaging technique increases the signal to noise ratio of seismic data and reduces the number of seismic traces that have to be processed. Seismic data are composed of several traces, each trace being associated with a given midpoint. The midpoint associated with a trace is the point on the ground surface located half-way between the source and the receiver that generated the trace. Traces are grouped into common midpoint gathers, and are then migrated according to a normal migration operation (NMO) or deep migration operation (DMO).

However, due to obstacles or an irregular topography or feathering (in the case of an acquisition in marine seismic), it is practically impossible to record groups of traces with exactly the same midpoints.

The ground surface is divided into square or rectangular unit cells called "bins", forming a two dimensional grid, in order to manage these variations of midpoints. Dimensions of bins are determined by the geometric arrangement of the sources and the receivers. They depend on distances between two consecutive sources and two consecutive receivers. As the spacing between sources and receivers increases, the dimensions of bins will also become greater. The size of bins must be adapted to spatial sampling constraints of the acquisition.

The midpoint of each source-receiver pair is associated with the bin to which the midpoint belongs. The number of source-receiver pairs associated with each bin defines the fold. Irregularities in the acquisition geometry imply that the fold is not always uniform over all bins. This non-uniformity can generate problems during data processing. This is why it is normal to select a single trace per bin and per offset class during a "binning" step.

The purpose of time-lapse seismic or 4D seismic is to observe the variation of geological structures of the subsoil, such as reservoirs, during a given time period. Time-lapse seismic is based on several seismic surveys (at least two) of the same geological structure carried out at different instants.

The initial survey is called the base survey, and subsequent survey(s) is (are) called monitor survey(s). These various surveys are used to produce several 3D seismic data sets, each seismic data set being acquired at a given instant. The differences between two data sets allows to measure the change in the properties of the surveyed geological structure.

However, one concern of time-lapse seismic is measurement repeatability. Base surveys and monitor surveys are not usually obtained with the same geometric configuration of sources and receivers. Furthermore, measurements are affected by disturbances such as feathering. These disturbances generate unwanted differences in the amplitude and chronology of seismic reflections that are found in 3D data sets and modify the result of 4D measurements.

Repeatability between surveys can be improved in the binning step by selecting traces according to selection/rejection criteria. The trace selection may be made in each data set independently, or by taking account of several data sets.

X-P. Li et al. (Azimuth preserved trace binning of 4D seismic data for improved repeatability", EAGE 65th Conference and Exhibition, Stavanger, Norway, Jun. 2-5, 2003) describes a process for selecting traces according to selection criteria during the binning step for two data sets. In a first data set, traces are selected as a function of the distance between the midpoint associated with the trace being considered and the centre of the nearest bin. Then in the second data set, traces are selected as a function of the azimuth at which these traces were acquired, in comparison with the acquisition azimuth of traces in the first set of data. In other words, for two identical bins in the first and second data sets, the trace that will be selected in the second data set is the trace for which the azimuth best corresponds to the azimuth associated with the bin of the first data set.

This process provides a means of selecting traces in the data sets as a function of navigation criteria, in other words criteria related to the geometry of the acquisition. Two traces are selected when the geometric conditions in which they are acquired are similar.

A disadvantage of this type of process is that it does not take account of the quality of the selected traces. Consequently, these processes do not result in optimum repeatability between surveys.

The problem solved by the invention is to improve repeatability between surveys.

This problem is solved within the context of the invention by means of a method for processing at least two seismic data sets, each data set comprising several seismic traces grouped by bins and by offset classes, the method including the following steps:

calculating at least one attribute characteristic of a similarity between a first trace of a first data set and a second trace of a second data set, selecting or not the first and second traces according to a selection criterion applied to the calculated attribute.

The method according to the invention provides a means of selecting traces depending on their similarity and not only depending on the geometric conditions of their acquisition.

Thus, the method according to the invention is based on a qualitative comparison between traces. The result is that this process provides processed sets of data that match better with each other than data sets that are obtained by binning methods according to the prior art.

Characteristic attributes of a similarity between the first and second traces may for example be the cross-correlation product of the first and second traces, predictability between the first and second traces or the normalised Root Mean Square (RMS) amplitude of the first and second traces.

In order to select traces, these attributes may be compared with a threshold, or a maximum attribute value may be determined.

Furthermore, in one advantageous embodiment of the invention, for a given first trace of the first data set, several attributes are calculated corresponding to several second traces, the said second traces being taken from inside a search area in the second data set.

More precisely, the search area extends not only to several bins (which is equivalent to operating an elastic binning), but also several offset classes.

First traces contained in the first data set are compared not only with traces contained in the second data set which have the same offset class, but also with traces in neighbouring offset classes. This characteristic provides a means of extending the field of comparison between traces derived from two data sets compared with methods according to prior art. Thus, the invention can give measurement results that are more precise and more relevant than in prior art.

Figure 4:
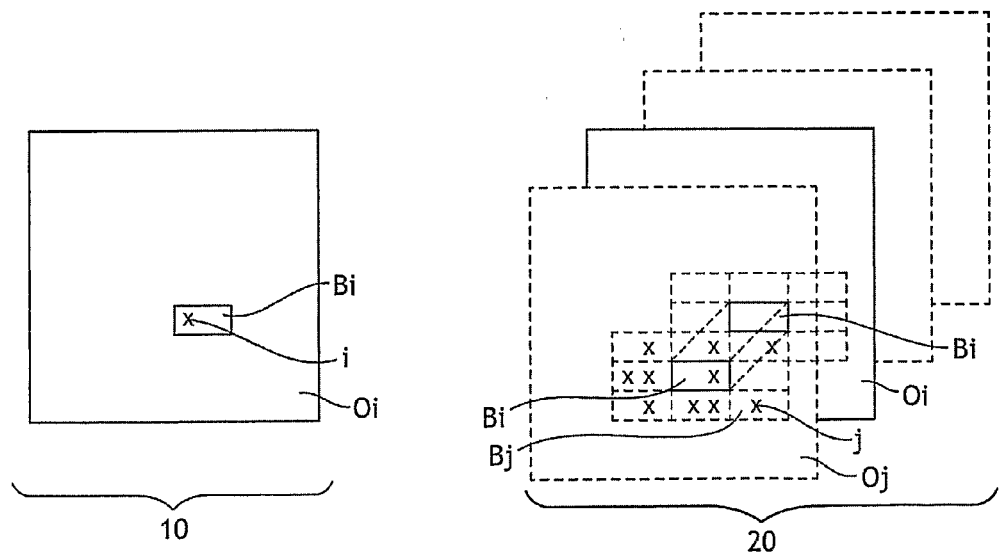
Figure 2:
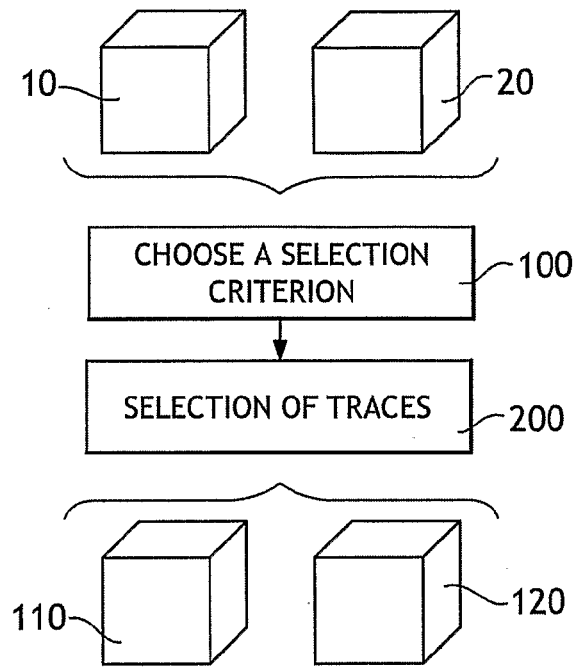
Figure 3:
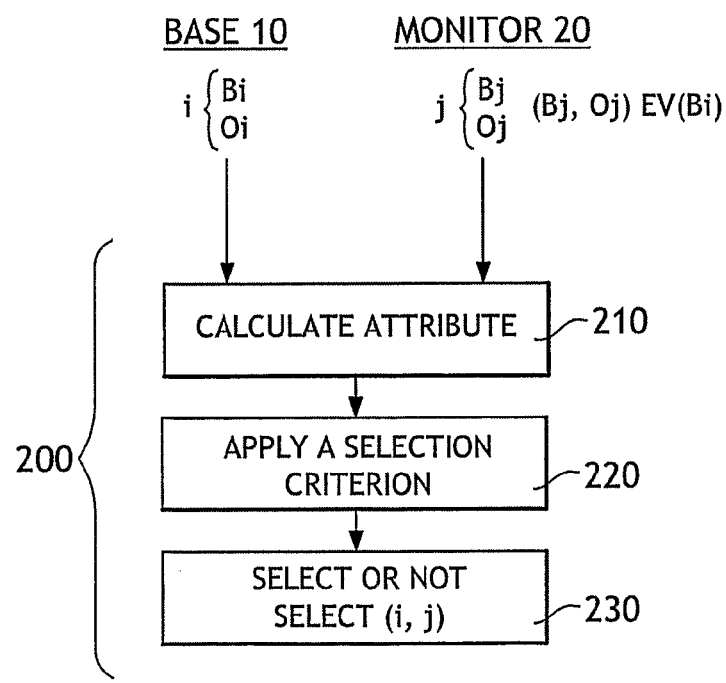
Figure 5:
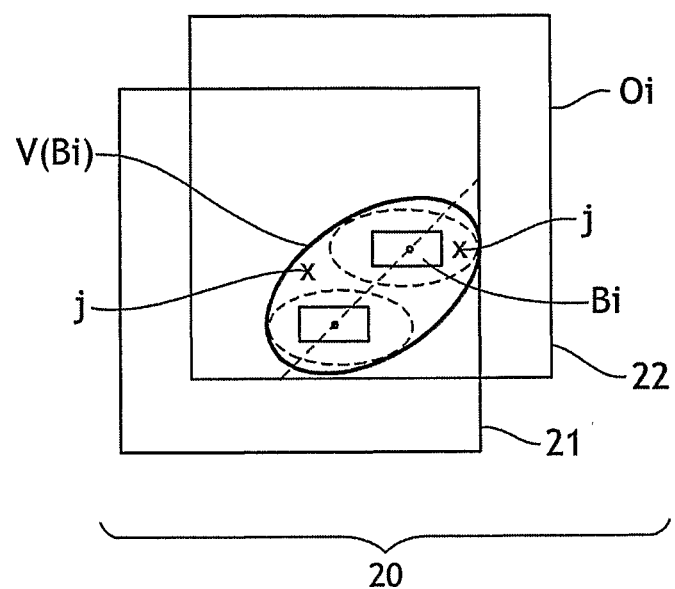

Other characteristics and advantages will become clear from the following description that should be read with reference to the attached drawings among which:

FIG. 1 schematically shows two sets of data to be processed according to a method according to the invention, FIG. 2 schematically shows the main steps in a processing method according to the invention, FIG. 3 schematically shows sub-steps in the trace selection step, FIG. 4 schematically shows the second traces that are used in the second data set to be compared with a first trace of the first data set, FIG. 5 shows an example neighbourhood forming a search area in which the second traces are taken into account.

In the following description, the expression "offset" refers to the distance between a seismic source that emits a seismic wave and a receiver that detects the seismic wave emitted by this source. Each trace recorded by a receiver is associated with a given offset. The expression "offset class" refers to a range of offsets.

The expression "bin" refers to a unitary cell corresponding to a portion of the ground surface that is covered by the arrangement of sources and receivers.

As illustrated in FIG. 1, the method for processing seismic data is applied to two data sets 10 and 20 that were acquired during two seismic surveys carried out at two different moments.

The first data set 10 was acquired during the base survey and will be called "base", while the second data set 20 was acquired during a monitor survey and will be called "monitor".

The base data set 10 and the monitor data set 20 are each composed of a gather of traces referenced 1 and 2 respectively. In the base data set 10, traces i are grouped by offset classes 11, 12, 13, 14 and by bins 15. Similarly, traces j in the monitor data set 20 are grouped in offset classes 21, 22, 23, 24 and in bins 25. The offset classes and bins are identical in the two data sets 10 and 20, but the traces i and j are different since they correspond to two different surveys.

As illustrated in FIG. 2, the method of processing data sets 10 and 20 includes two main steps that consist of choosing one or several trace selection criteria (step 100) and selecting traces in the two data sets 10 and 20 based on the selected criteria (step 200). The method results in two processed data sets 110 and 120 that only contain traces selected from the data sets 10 and 20. The data sets 110 and 120 have a better mutual repeatability than the unprocessed data sets 10 and 20.

Thus, the data sets 110 and 120 can be used as a basis for 4D measurement.

One or several selection criteria are chosen in step 100. These criteria include seismic criteria and possibly geometric criteria. For example, seismic criteria are applicable to the cross-correlation product between traces, predictability between traces or the normalised RMS amplitude between acquired traces. The navigation criteria may for example relate to the difference between orientation in source-receiver azimuth between recorded traces or the distance between a trace and the centre of the bin with which it is associated.

As shown in FIG. 3, the trace selection step 200 includes sub-step for calculating an attribute (sub-step 210), a sub-step for application of the selection criteria (sub-step 220) and a sub-step for selecting or not selecting traces (sub-step 230).

In sub-step 210 for calculating an attribute, for a trace i associated with a bin $B_i$ and an offset class $O_i$ in the base data set 10, a trace j associated with a bin $B_j$, in an offset class $O_j$ of the monitor data set 20, is considered. As illustrated on FIG. 4, trace j is chosen in a bin $B_j$ and an offset class $O_j$ in a neighbourhood $V(B_i)$ of the bin $B_i$. As can be seen in FIG. 4, the neighbourhood $V(B_i)$ extends not only on several bins, but also on several offset classes.

For each trace i associated with bin $B_i$ and with offset class $O_i$, and each trace j associated with $B_j$ and offset class $O_j$, an attribute a(i,j) is calculated that characterises repeatability between traces i and j.

According to a first example embodiment of the invention, the attribute a(i, j) is the cross-correlation product cc(i, j) of traces i and j.

$$cc(i, j)(t) = i(t) \otimes j(-t) = \sum_{k=-\infty}^{+\infty} i(t_k) \cdot j(t + t_k)$$

The maximum amplitude of the correlation product occurs when i and j are similar.

According to a second example embodiment of the invention, the attribute a(i,j) is the predictability pr(i,j) between traces i and j.

$$pr(i, j) = \frac{\sum cc(i, j) \times \sum cc(i, j)}{\sum ac(i) \times \sum ac(j)}$$

where cc is the cross-correlation product between traces, ac is the auto-correlation product of a trace and $\Sigma$ is the integral over a predetermined time window.

The predictability pr is comprised between 0 and 1. If pr(i, j)=1, then traces i and j are perfectly repeatable. The predictability pr is not sensitive to static phase and amplitude differences between traces i and j. On the other hand, the predictability pr is sensitive to the width of the time correlation window, modifications of the reflectivity of the subsoil and noise.

According to a third example embodiment of the invention, the attribute a(i,j) is the normalised Root Mean Square (RMS) amplitude of traces i and j.

$$NRMS(i, j) + \frac{2RMS(i - j)}{RMS(i) + RMS(j)}$$

-continued $$\text{where RMS}(x) = \sqrt{\frac{\sum_{k=1}^{n}(x(t_k)^2)}{n}}$$

where $[t_1, t_n]$ is a predetermined time window in which the function x is sampled n times.

The normalised RMS amplitude is sensitive to modifications of the subsoil and to noise.

Obviously, other attributes characterizing the similarity between traces i and j could be calculated. It is also possible to calculate mixed attributes, for example combining the cross-correlation product of traces i and j and the difference in normalised RMS amplitude between traces i and j.

The selection application sub-step 220 consists of determining which of the traces j considered in the neighbourhood $V(B_i)$ best matches (or is most similar) with the trace i considered.

According to a first example embodiment of this sub-step 220, the applied selection criterion corresponds to a comparison with a threshold A to determine the pairs (i,j) that have sufficient repeatability. The attribute a(i,j) calculated for each pair of traces (i,j) is compared with threshold A.

If the attribute a(i,j) is greater than the threshold A, the pair of traces (i,j) is selected. On the other hand, if the attribute a(i,j) is less than this threshold A, the pair of traces (i, j) is not selected.

For example, if NRMS(i, j)<0.5, then the pair of traces (i,j) is not selected. On the other hand, if NRMS(i,j)≥0.5, then the pair of traces (i,j) is selected.

According to a second example embodiment of sub-step 220, the applied selection criterion corresponds to the calculation of a maximum attribute value max (a(i,j)).

i∈$B_i$
j∈$V(B_i)$

For example, for a given trace i, the trace j for which pr(i,j)=max (pr(i,j)) is selected.

i∈$B_i$
j∈$V(B_i)$

It can be understood that sub-steps 210 and 220 lead to simultaneous selection of traces i and j in data sets 10 and 20. For a same trace i of the base data set 10, several traces j of the monitor data set 20 can satisfy the applied selection criterion.

Sub-step 220 can be repeated by applying an additional selection criterion on previously selected traces.

According to sub-step 230, the pair of traces (i, j) may or may not be selected to obtain the processed data sets 110 to 120.

The neighbourhood $V(B_i)$ that forms a search area for a trace j may have several different configurations. In FIG. 5, the neighbourhood $V(B_i)$ extends around the offset class $O_i$ and around the bin $B_i$ associated with the trace i. The neighbourhood $V(B_i)$ is delimited by an ellipsoid. As can be seen in this figure, the ellipsoid has two focuses, one of the focuses being the centre of the bin $B_i$ associated with trace i in offset class $O_i$ and the other focus being the centre of the same bin $B_i$ in another offset class $O_{i+1}$ adjacent to class $O_i$ associated with trace i.

The invention claimed is:

1. Method for processing at least two sets of seismic data corresponding to an underground geological structure, each data set comprising several seismic traces (i, j), said method including the following steps:
grouping seismic traces of a first data set by bins ($B_i$) and by offset classes ($O_i$);
grouping seismic traces of a second data set by bins ($B_j$) and by offset classes ($O_i$), wherein an offset class includes a range of offsets;
calculating at least one attribute (a(i,j)) characteristic of a similarity between a first trace (i) of the first data set and a second trace (j) of the second data set, in which the second data set is acquired at a time subsequent to acquiring the first data set; and
selecting the first and second traces (i, j) when the at least one attribute (a(i,j)) characteristic of similarity between the first trace and the second trace exceeds a threshold value, and using the selected first and second traces to obtain an image of the underground geological structure,
in which for a given first trace (i), several attributes (a(i,j)) are calculated corresponding to several second traces (j), said second traces (j) being taken from inside a search area (V) in the second data set,
in which the search area (V) extends over several offset classes.

2. Method according to claim 1, in which the search area includes a neighborhood ($V(B_i)$) predetermined around an offset class ($O_i$) associated with the first trace (i).

3. Method according to claim 1 in which the search area extends over several bins.

4. Method according to claim 3, in which the search area includes a predetermined neighborhood ($V(B_i)$) around a bin ($B_i$) associated with the first trace (i).

5. Method according to claim 1, in which the search area includes a neighborhood ($V(B_i)$) around an offset class ($O_i$) and a bin ($B_i$) associated with the first trace (i), the neighborhood ($V(B_i)$) being delimited by an ellipsoid.

6. Method according to claim 5, in which the ellipsoid has two focuses, one of the focuses being the centre of the bin (Bi) associated with the first trace (i) in the offset class ($O_i$) associated with the first trace (i), and the other focus being the centre of the same bin ($B_i$) associated with the first trace (i) in an offset class ($B_{i+1}$) adjacent to offset class ($O_i$) associated with the first trace (i).

7. Method according to claim 1, in which an attribute (a(i,j)) calculated for the first and second traces, (i, j) is a cross-correlation product (cc(i,j)) of the first and second traces (i,j).

8. Method according to claim 1, in which an attribute (a(i,j)) calculated for the first and second traces (i, j) is a predictability (pr(i,j)) between the first and second traces (i,j).

9. Method according to claim 1, in which an attribute (a(i,j)) calculated for the first and second traces (i, j) is a normalized RMS amplitude of the first and second traces (i,j).

10. Method according to claim 1, in which the selection step includes determination of a maximum attribute value (max (a(i,j))).

11. A method for processing at least two sets of seismic data relating to a geological structure, said method including the following steps:
grouping seismic traces of a first base data set by bins ($B_i$) and by offset classes ($O_j$);
grouping seismic traces of a second monitor data set by bins (Bj) and by offset classes ($O_j$), wherein an offset class includes a range of offsets;
calculating at least one attribute (a(i,j)) characteristic of a similarity between a first trace (i) of the first base data set and a second trace (j) of the second monitor data set, in which the second monitor data set is acquired at a time subsequent to acquiring the first base data set;

selecting the first and second traces (i,j) according to a selection criterion applied to the calculated attribute (a(i, j)); and measuring changes in properties of the geological structure from the difference between the selected traces of the first base data set and of the second monitor data set.

12. The method of claim 11, in which for a given first trace (i), several attributes (a(i,j)) are calculated corresponding to several second traces (j), said second traces (j) being taken from inside a search area (V) in the second monitor data set.

13. The method of claim 12, in which the search area (V) extends over several offset classes.

14. The method of claim 13, in which the search area includes a neighborhood (V($B_i$)) predetermined around an offset class ($O_i$) associated with the first trace (i).

15. The method of claim 12, in which the search area extends over several bins.

16. The method of claim 12, in which the search area includes a predetermined neighborhood (V($B_i$)) around a bin ($B_i$) associated with the first trace (i).

17. The method of claim 12, in which the search area includes a neighborhood (V($B_i$)) around a bin ($B_i$) associated with the first trace (i).

18. The method of claim 17, in which the neighborhood (V($B_j$)) is an ellipsoid having two focuses, one of the focuses being the centre of the bin ($B_i$) associated with the first trace (i) in the offset class ($O_i$) associated with the first trace (i), and the other focus being the centre of the same bin ($B_i$) associated with the first trace (i) in an offset class ($BO_{i+1}$) adjacent to offset class ($O_i$) associated with the first trace (i).

19. The method of claim 11, in which an attribute (a(i,j)) calculated for the first and second traces (i,j) is a cross-correlation product (cc(i,j)) of the first and second traces (i,j).

20. The method of claim 11, in which an attribute (a(i,j)) calculated for the first and second traces (i,j) is a predictability (cc(i,j)) between the first and second traces (i,j).

21. The method of claim 11, in which an attribute (a(i,j)) calculated for the first and second traces (i,j) is a normalized RMS amplitude of the first and second traces (i,j).

22. The method of claim 11, in which the step of selecting comprises comparing an attribute (a(i,j)) and a threshold (A).

23. The method of claim 11, in which the step of selecting comprises determining of a maximum attribute value (max (a(i,j))).

* * * * *

UNITED STATES PATENT AND TRADEMARK OFFICE
CERTIFICATE OF CORRECTION

PATENT NO. : 8,687,463 B2
APPLICATION NO. : 11/791182
DATED : April 1, 2014
INVENTOR(S) : Brain et al.

It is certified that error appears in the above-identified patent and that said Letters Patent is hereby corrected as shown below:

In the specification

In Column 4, Line 65, delete "$NRMS(i,j) + \dfrac{2RMS(i-j)}{\overline{RMS(i)+RMS(j)}}$" and insert -- $NRMS(i,j) = \dfrac{2RMS(i-j)}{RMS(i)+RMS(j)}$ --, therefor.

In the claims

In Column 6, Line 2, in Claim 1, delete "(O_i), wherein" and insert -- (O_j), wherein --, therefor.

In Column 6, Line 59, in Claim 11, delete "(O_j);" and insert -- (O_i); --, therefor.

In Column 8, Line 2, in Claim 18, delete "(V(B_j)) is an ellipsoid havinq" and insert -- (V(B_i)) is an ellipsoid having --, therefor.

In Column 8, Line 6, in Claim 18, delete "(BO_{i+1})" and insert -- (O_{i+1}) --, therefor.

Signed and Sealed this
Eighth Day of December, 2015

Michelle K. Lee
*Director of the United States Patent and Trademark Office*